United States Patent [19]

Kawarabayashi

[11] Patent Number: 4,656,576
[45] Date of Patent: Apr. 7, 1987

[54] CONTROL SYSTEM FOR A CHASSIS DYNAMOMETER

[75] Inventor: Shigeyuki Kawarabayashi, Kyoto, Japan

[73] Assignee: Horiba Ltd., Kyoto, Japan

[21] Appl. No.: 634,117

[22] Filed: Jul. 24, 1984

[30] Foreign Application Priority Data

Aug. 2, 1983 [JP] Japan ................. 58-142224

[51] Int. Cl.$^4$ ............... G06F 15/20; G01M 15/00
[52] U.S. Cl. ..................... 364/148; 73/117; 73/862.08; 364/152; 364/165; 364/551; 364/565
[58] Field of Search ............ 364/148, 152, 153, 156, 364/164, 165, 550, 551, 565, 571; 73/862, 862.08, 862.27, 862.68, 117, 861.18

[56] References Cited

U.S. PATENT DOCUMENTS

| | | | |
|---|---|---|---|
| 4,057,708 | 11/1977 | Greeley et al. | 364/423 X |
| 4,236,158 | 11/1980 | Daniel | 343/380 |
| 4,253,184 | 2/1981 | Gitlin et al. | 333/18 X |
| 4,327,578 | 5/1982 | D'Angelo | 73/117 |
| 4,442,708 | 4/1984 | Gable et al. | 73/862.18 X |

*Primary Examiner*—Joseph Ruggiero
*Attorney, Agent, or Firm*—Wenderoth, Lind & Ponack

[57] ABSTRACT

A control system for a chassis dynamometer has a computing circuit which computes the gradient of an evaluation function on the basis of outputs of a torque sensor and a speed sensor provided on a shaft directly connecting a roller and a dynamometer and a sequential correction computing circuit of feedback control circuit. The steepest descent method is used so as to reduce the evaluation function to a minimum and to thereby sequentially compute the predicted output values of said dynamometer. The control system for the dynamometer is stable and superior in its quick response and simple in its circuit construction.

1 Claim, 2 Drawing Figures

CONTROL SYSTEM FOR A CHASSIS DYNAMOMETER

BACKGROUND OF THE INVENTION

1. Field of the Invention

This invention relates to a control system for a chassis dynamometer.

2. Description of the Prior Art

The control system for the chassis dynamometer includes a torque control system in combination of a feedforward control and a feedback control.

FIG. 1 is a block diagram of a prior art control system for a chassis dynamometer applying the torque control system.

In FIG. 1, element 1 is a roller for carrying a drive wheel of a vehicle to be tested; element 2 is a dynamometer provided with a generator serving as a driving force absorption device; element 3 is a shaft directly connecting the roller 1 and dynamometer 2; elements 4 and 5 are designate a torque sensor and a speed sensor mounted to the shaft 3 respectively, and element 6 is an electrical power converter which controls a field current or an exciting current to the dynamometer on the basis of a control signal from a control system 10 to be discussed below so as to thereby allow the dynamometer to absorb a force output from a vehicle.

The control system 10 comprises a feedforward control circuit 11 carrying out the feedforward control on the basis of measured values by the torque sensor 4 and speed sensor 5 and a PI (Proportional Integration) control circuit 13 for stably compensating an output of an error function computed in an error function generator circuit 12 and performs feedback control so that the integrated value of an error $\epsilon(t)$ between a predicted output value $F'_{PAU}(t+\Delta T)$ of the dynamometer 2 and a desired value $F_{TT}(t)+Lm\ (V)$ becomes zero.

In other words, when the running resistance as the function of vehicle speed V is represented by RL (V), and the vehicle's weight by I, and the acceleration of vehicle by $\alpha$, a force $F_{veh}$ output by the vehicle is given as:

$$F_{veh} = RL\ (V) + I \cdot \alpha \quad (1)$$

This equation, when represented by the weight Im of a flywheel 7 and an electrical inertia Ie, is given as:

$$F_{veh} = RL\ (V) + Im \cdot \alpha + Ie \cdot \alpha \quad (2)$$

Since Im·$\alpha$ is absorbed by the flywheel 7, a force $F_{PAU}$ to be absorbed by the dynamometer 2 in the next time step $t + \Delta T$ is given by the equation:

$$F_{PAU}(t+\Delta T) = RL\ (V) + Ie \cdot \alpha \quad (3)$$

Here, when $F_{veh}$ is expressed by use of an output $F_{TT}$ of torque sensor 4, the following equation should hold:

$$F_{veh} = F_{TT} + Im \frac{dV}{dt} + Lm(V) \quad (4)$$

where Lm (V): mechanical loss.

On the other hand, when a weight of a roller at a motor in the dynamometer 2 is represented by Ir, the following equation holds:

$$I = Im + Ir + Ie \quad (5)$$

The force $F_{PAU}$ to be absorbed by the dynamometer 2 is obtained from the equations (1), (4) and (5) as follows:

$$F_{PAU}(t+\Delta T) = \quad (7)$$

$$\frac{Im + Ir}{I} RL(V) + \frac{Ie}{I}\left(F_{TT}(t) + Im\frac{dV}{dt} + Lm(V)\right)$$

The force $F_{PAU}$ is controlled by the feedforward control circuit (11) and the integrated value of error $\epsilon(t)$ between the predicted output value $F'_{PAU}(t+\Delta T)$ and the desired value $F_{TT}(t)+Lm\ (V)$, which is given by:

$$\int_0^t \epsilon(t)dt = \int_0^t (F_{TT}(t) + Lm(V) - F'_{PAU}(t+\Delta T))dt \quad (8)$$

$$= \int_0^t (F_{TT}(t) + Lm(V) - RL(V))dt - (I - Im) \cdot V$$

is used as the error function so that the feedback control is carried out until the above error function becomes zero.

The control system combines the quick response, a merit of feedforward control and the stability, that of feedback control, which is defective in the following matters. Especially for a lightweight vehicle, instability may be introduced in the control system so as to thereby reduce the stability and thereby become uncontrollable. Also, the PI controller requires two kinds of parameters, whereby a problem has been created in that control adjustment becomes troublesome. Furthermore, when this system is intended to obtain a quick response, overshoot is not avoidable, thereby creating a problem in that a capacity of a capacitor of the power converter 6 should be raised.

SUMMARY OF THE INVENTION

An object of the invention is to provide a control system for a dynamometer, which is stable and superior in its quick response and simple in its circuit construction.

This invention is characterized in that a computing circuit for computing a gradient of an evaluation function on the basis of outputs from a torque sensor and speed sensor and a sequential correction computing circuit of a feedback circuit are provided using the steepest descent method, thereby computing the predicted output value of the dynamometer.

The above and further objects and novel features of the invention will more fully appear from the following detailed description when the same is read in connection wih the accompanying drawing.

DESCRIPTION OF THE PREFERRED EMBODIMENT

Figure 1:
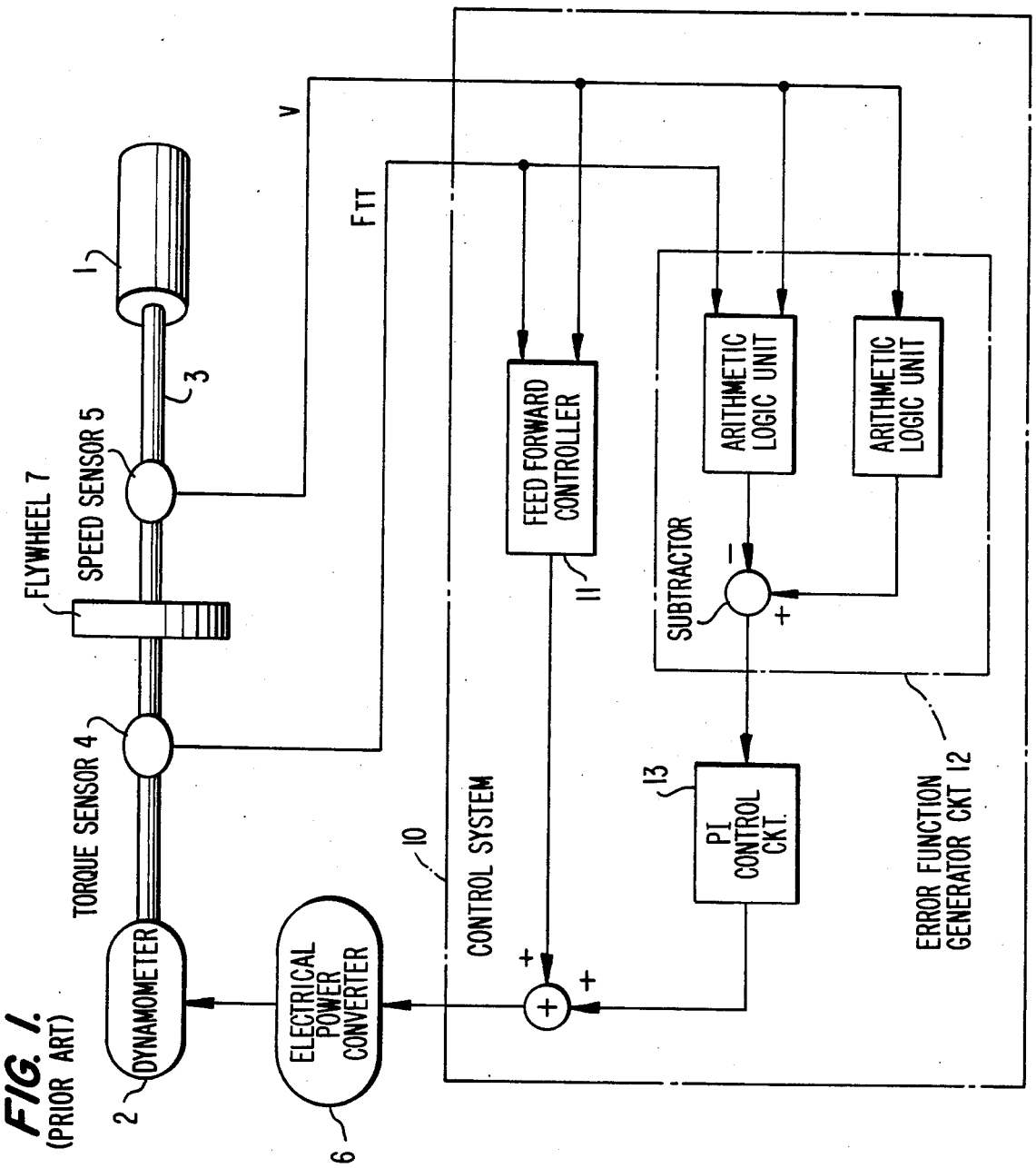
FIG. 1 is a block diagram of a prior art control system for a chassis dynamometer.
Figure 2:
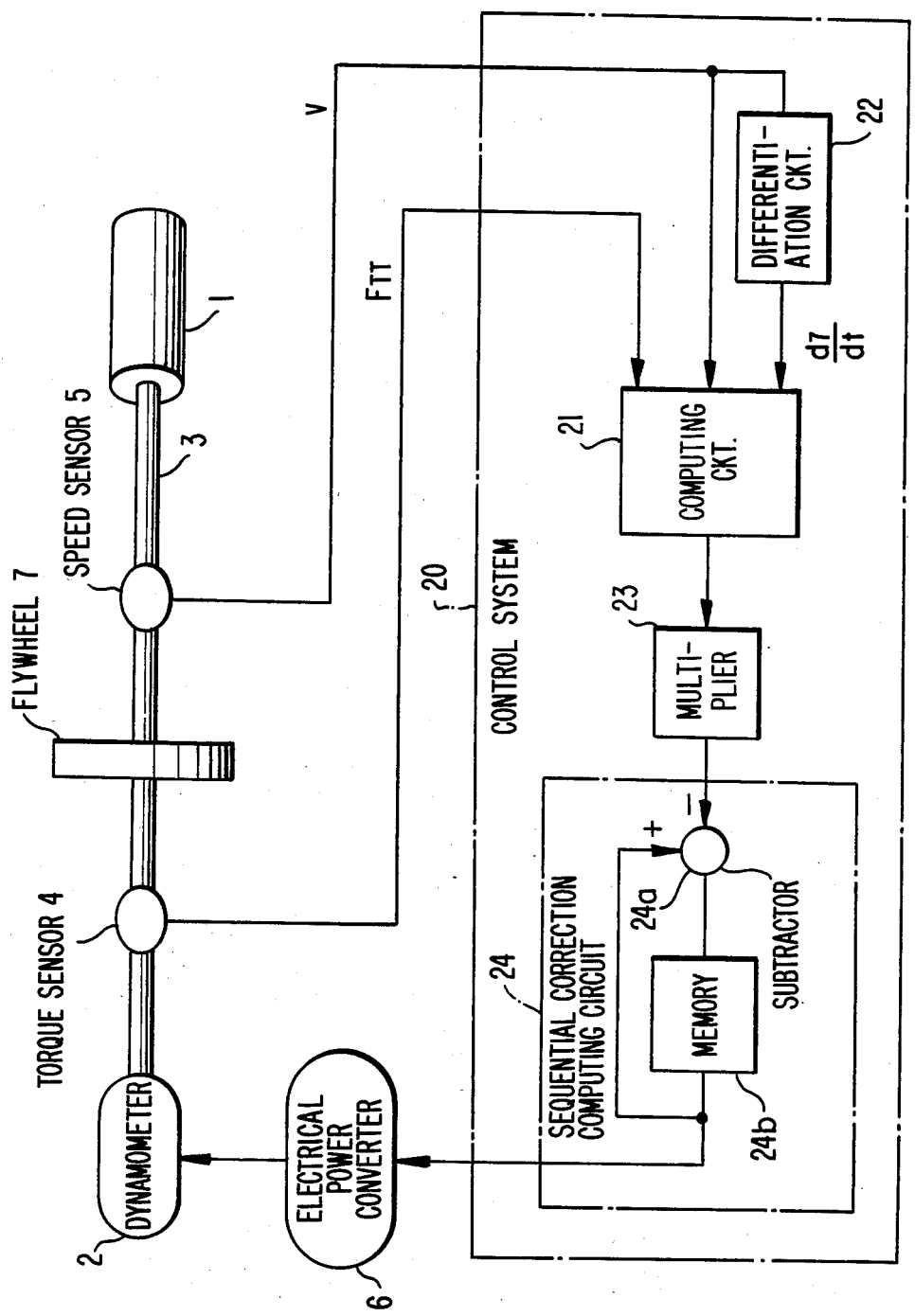
FIG. 2 is a block diagram of an embodiment of a control system for a chassis dynamometer in accordance with the present invention.

Referring to FIG. 2, the components the same as in FIG. 1 are designated by the same reference numerals.

In FIG. 2, element 20 is a control system of the present invention; element 21 is a computing circuit for computing the gradient of evaluation function J to be discussed below, which is fed a force $F_{TT}(t)$ measured by a torque sensor 4, and a speed V measured by a speed sensor 5 and an acceleration dV/dt obtained by a differentiation circuit 22; element 23 is a multiplier which multiplies a computed output of computing circuit 21 by the constant $\alpha$, and element 24 is a sequential correction computing circuit comprising a subtractor 24a for feedback and a memory 24b, which sequentially correction-computes a control signal $F_{PAU}(t+\Delta T)$ of the power converter 6.

In the present invention, an evaluation function J represented by the following equation is used corresponding to the aforesaid error function $\epsilon(t)$:

$$J = (F_{TT}(t) + Lm(V) - F_{PAU}(t+\Delta T))^2$$

The gradient $\nabla \cdot J$ of such evaluation function J is obtained by the computing circuit 21 as follows:

$$\nabla \cdot J = F_{TT}(t) + Lm(V) - RL(V) - (I - Im)\frac{dV}{dt} \quad (9)$$

By substituting into the above equation (9) $F_{TT}$ and V of measured values by the torque sensor 4 and speed sensor 5 and dV/dt of output from the differentiation circuit 22, the gradient $\nabla \cdot J$ of evaluation function J is obtained. At the multiplier 23, the gradient $\nabla \cdot J$ is multiplied by a smaller constant $\alpha$ and fed to the sequential correction computing circuit 24.

Since the memory 24b always stores the signal $F_{PAU}(t)$ in the step (time) ahead, a control signal $F_{PAU}(t+\Delta T)$ in the next step of power converter 6 is given by the steepest descent method in the following equation:

$$F_{PAU}(t + \Delta T) = F_{PAU}(t) - \alpha \cdot \nabla \cdot J \quad (10)$$

$$= F_{PAU}(t) - \alpha \left\{ F_{TT}(t) + Lm(V) - RL(V) - (I - Im)\frac{dV}{dt} \right\}$$

In other words, the sequential correction computing circuit 24 comprising the feedback subtractor 24a and memory 24b sequentially correction computes the control signal $F_{PAU}(t+\Delta T)$ of power converter 6 by the use of the steepest descent method corresponding to fluctuations of acceleration or deceleration as shown in the aforesaid equation (10). Hence, the power converter 6 controls an exciting current or a field current to the dynamometer 2 so that the dynamometer 2 can generate within the predetermined time the force to absorb the force output from the vehicle.

The control system for the chassis dynamometer of the present invention constructed as the above-mentioned has the following effects:

(1) Since the steepest descent method is used to minimize the evaluation function so as to sequentially correction-compute the predicted output value of the dynamometer, response to fluctuations (that is the dynamic characteristic) of the system is improved.

(2) Substantially only feedback control is used and control can be stabilized.

(3) Proper selection of the parameters eliminates overshoot to enable a quick response to be realized.

(4) A plurality of parameters need not be used, thereby facilitating the control adjustment and simplifying the circuit constitution.

While a preferred embodiment of the invention has been described using specific terms, such description is for illustrative purpose only, and it is to be understood that changes and variations may be made without departing from the sprit or scope of the following claims.

We claim:

1. A control system for a chassis dynamometer having a torque sensor and a speed sensor for respectively providing torque and speed signals with respect to said dynamometer, said control system comprising:

a differentiator means connected to said speed sensor for differentiating said speed signal and for producing a differential speed signal corresponding thereto;

a computing means connected to said speed and torque sensors and said differentiator means for receiving said speed and torque and differentiated speed signals and for providing a computed output signal therefrom corresponding to a gradient of an evaluation function on the basis of said received signals;

a multiplier means connected to said computing means for multiplying said computed output signal by a constant and for producing an output signal corresponding thereto;

a sequential correction computing means connected to said multiplier means for producing a control signal for controlling said dynamometer through a power converter means, said correction computing means comprising a subtracting means connected to a memory means, said memory means storing an output signal from said subtractor means and outputting a stored signal to both said power converter means and to an input of said subtracting means, another input of said subtracting means being connected to said multiplier means for receiving an output signal therefrom such that said subtracting means produces a signal which is fed to said memory means and corresponds to a difference between said signal output from said multiplier means and said stored signal output from said memory means, wherein said evaluation function is reduced to a minimum by the steepest descent method such that fluctuations in acceleration or deceleration of a system mechanically connected to said dynamometer and corresponding to fluctuations in forces from said system are absorbed by said dynamometer.

* * * * *